United States Patent
Naghian (10) Patent No.: US 7,394,798 B2
(45) Date of Patent: Jul. 1, 2008

(54) PUSH-TO TALK OVER AD-HOC NETWORKS

(75) Inventor: Siamák Naghian, Espoo (FI)

(73) Assignee: Spyder Navigations, L.L.C., Wilmington, DE (US)

( * ) Notice: Subject to any disclaimer, the term of this patent is extended or adjusted under 35 U.S.C. 154(b) by 532 days.

(21) Appl. No.: 10/962,694

(22) Filed: Oct. 13, 2004

(65) Prior Publication Data

US 2006/0002328 A1   Jan. 5, 2006

(30) Foreign Application Priority Data

Jun. 30, 2004   (EP)   ................................. 04015322

(51) Int. Cl.
  *H04Q 7/24*   (2006.01)
(52) U.S. Cl. .................. 370/338; 455/519; 455/518
(58) Field of Classification Search ................. 370/338, 370/360; 455/517, 518, 519, 41.2
  See application file for complete search history.

(56) References Cited

U.S. PATENT DOCUMENTS 7,170,863 B1 *   1/2007   Denman et al. ............. 370/260

2003/0186716 A1   10/2003   Dorenbosch et al.
2003/0235175 A1   12/2003   Naghian et al.

FOREIGN PATENT DOCUMENTS

WO   WO 2004/001519 A3   12/2003

OTHER PUBLICATIONS

Specification of the Bluetooth System, Feb. 2001, Bluetooth, Version 1.1, pp. 120-123.*
Royer, Elizabeth M. "A Review of Current Routing Protocols for Ad Hoc Mobile Wireless Networks", IEEE Personal Communications, Apr. 1999; pp. 46-55.

* cited by examiner

*Primary Examiner*—Lewis West (57) ABSTRACT

The invention proposes a network system comprising a plurality of network nodes (10, 11), each of the network nodes comprising means (103, 113) for temporarily forming a group with at least one of the plurality of network nodes, sending means (101, 111) for sending information (which may include voice, text message, images etc.) to the group and receiving means (102, 112) for receiving information from the group, wherein the sending means and the receiving means are configured to provide a direct contact via a radio connection (12) between at least two network nodes of the group. The invention also proposes a corresponding method, a corresponding network node and network control nodes for assisting in forming temporary groups.

36 Claims, 7 Drawing Sheets

PUSH-TO TALK OVER AD-HOC NETWORKS

BACKGROUND OF THE INVENTION

1. Field of the Invention

The invention relates to a network system, a method, and a network node by which a push-to talk function is realised.

2. Description of the Related Art

The invention relates to Push-To-Talk over Cellular (PoC). PoC is an open standard for PTT (Push-To-Talk) "walkie-talkie" technology. Created by the OMA (Open Mobile Alliance) standards organization, PoC uses VoIP (Voice over Internet Protocol) technology to stream voice over data networks such as GPRS (General Packet Radio Service).

In particular, PoC provides a connection of a network node (such as a mobile phone) to other network nodes. That is, a user starts a call with a push of key, similar as in "walkie-talkies". Push to talk calls are one-way communications, while one person speaks, the other(s) listen. A push-to talk connection is typically connected virtually instantaneously, that is, an "always-on" and bursty connection is provided.

As mentioned above, PoC uses the existing technology of the GPRS networks. That is, the connection is provided via the GPRS network control nodes such as SGSN (Serving GPRS Support Node) and GGSN (Gateway GPRS Support Node) and the like. Furthermore, for the PoC functionality, an additional PoC application server is provided, which is responsible for the basic PoC functions, group management, floor control, distribution and filtering of voice messages and the like.

That is, PoC involves considerable signalling in the network, since PoC is provided via the normal network resources such as base stations and the like. It can be expected that the PoC service will be used very frequently. Hence, the load on the current networks will raise very high, which might lead to the problem that—due to limited network sources—the service cannot be provided properly and cost-effectively.

SUMMARY OF THE INVENTION

Hence, it is an object of the present invention to overcome this problem such that the push-to talk function can be provided reliably also via singlehop or multihop direct radio links while controlled over the overlay networks like cellular or Internet.

This object is solved by a network system comprising a plurality of network nodes, each of the network nodes comprising means for temporarily forming a group with at least one of the plurality of network nodes, sending means for sending information to the group and receiving means for receiving information from the group, wherein the sending means and the receiving means are configured to provide a direct contact via a radio connection between at least two network nodes of the group.

Alternatively, the object is solved by a method for controlling a network system comprising a plurality of network nodes, comprising the steps of temporarily forming a group by at least two of the plurality of network nodes, sending and receiving information between at least two network nodes of the group of the network nodes, wherein in the sending and receiving step a direct contact via a radio connection between at least two network nodes of the group is provided.

Furthermore, the object is also solved by a network node comprising means for temporarily forming a group with at least one of a plurality of further network nodes, sending means for sending information to the group and receiving means for receiving information from the group, wherein the sending means and/or the receiving means are configured to provide a direct contact via a radio connection to at least one further network node of the group.

Thus, according to the invention network nodes can form a group in which a singlehop or multihop direct communication is possible. That is, the network nodes form an ad hoc network in which a push-to talk service is realised. Thus, for this push-to talk service, no signalling of the overly network is necessarily required, so that resources of the overlay network are saved.

Hence, also when the push-to talk service is increasingly used, the push-to talk function can be reliably provided, as the individual nodes become also part of the service machinery.

Furthermore, the invention proposes a network control node comprising means for assisting network nodes in establishing a group, wherein the group of the network nodes is formed temporarily and comprises at least two network nodes, a connection between the network control node and at least one network node is established via a mobile communication network, and the connection within each group is provided as a direct contact via a radio connection between at least two network nodes of the group.

Moreover, the invention proposes a network control node comprising means for assisting network nodes in establishing a connection between two groups of network nodes, wherein each group of the network nodes is formed temporarily and comprises at least two network nodes, a connection between the network control node and at least one network node is established via a mobile communication network, and the connection within each group is provided as a direct contact via a radio connection between at least two network nodes of the group.

Advantageous developments are set out in the dependent claims.

BRIEF DESCRIPTION OF THE DRAWINGS

The invention is described by referring to the enclosed drawings, in which.

DETAILED DESCRIPTION OF THE PREFERRED EMBODIMENT

In the following, a preferred embodiment of the present invention is described by referring to the attached drawings.

First, the problem underlying the invention is described in more detail.

The proposed method is aimed at realising a new connection service, which is referred to as push-to-talk over Ad Hoc (PoH), by defining the main procedures required for forming push-to-talk services over Ad Hoc networks.

The term "Ad-Hoc Network" means a network structure that is temporary and its configuration is performed automatically and constantly because nodes may appear, disappear and move unexpectedly. That is, a standalone ad hoc wireless network consists of wireless nodes that self-configure to form a network without any help from a central controller. Nodes in the network handle handshaking and other network tasks themselves through use of a distributed-control algorithm.

Ad Hoc networks in this context may include single and multihop standalone Ad Hoc networks formed by a group of, e.g., mobile handsets by using short-range radios such as Wireless Local Area Network (WLAN), Bluetooth (BT), Ultra WideBand (UWB), etc. Having integrated to the cellular networks, PoH can become a global service as is the basic Push-to-talk over Cellular (PoC) service. However, with PoH different users in the Ad Hoc groups are connected to each other either by establishing single and/or multihop links over Ad Hoc networks or partly by utilizing integrated Ad Hoc and cellular connections.

In this way, the potentials of proximity, local and wide area connectivity are summed in providing the half-duplex bursty services like PoH.

Rapid growth in the number of mobiles and portable devices equipped with emerging short-range radio modes is foreseen. Having integrated to mobile phones, these emerging technologies will bring the possibility of having direct peer-to-peer proximity connections to the neighbouring wireless devices. At the same time, Ad Hoc networking technology will bring about the realization of device networking by utilizing single hop or multihop radio connection with the help of wireless routing and self-organized networking. By enhancing the current PoC service in the above way, it would be readily possible to keep abreast the local groups of mobile users with the benefits of the PoC service. It will also enhance the PoC capability of swapping flexibly to the local and global domain when necessary.

The invention in it broadest form is described in the following by referring to FIG. 1.

Figure 1:
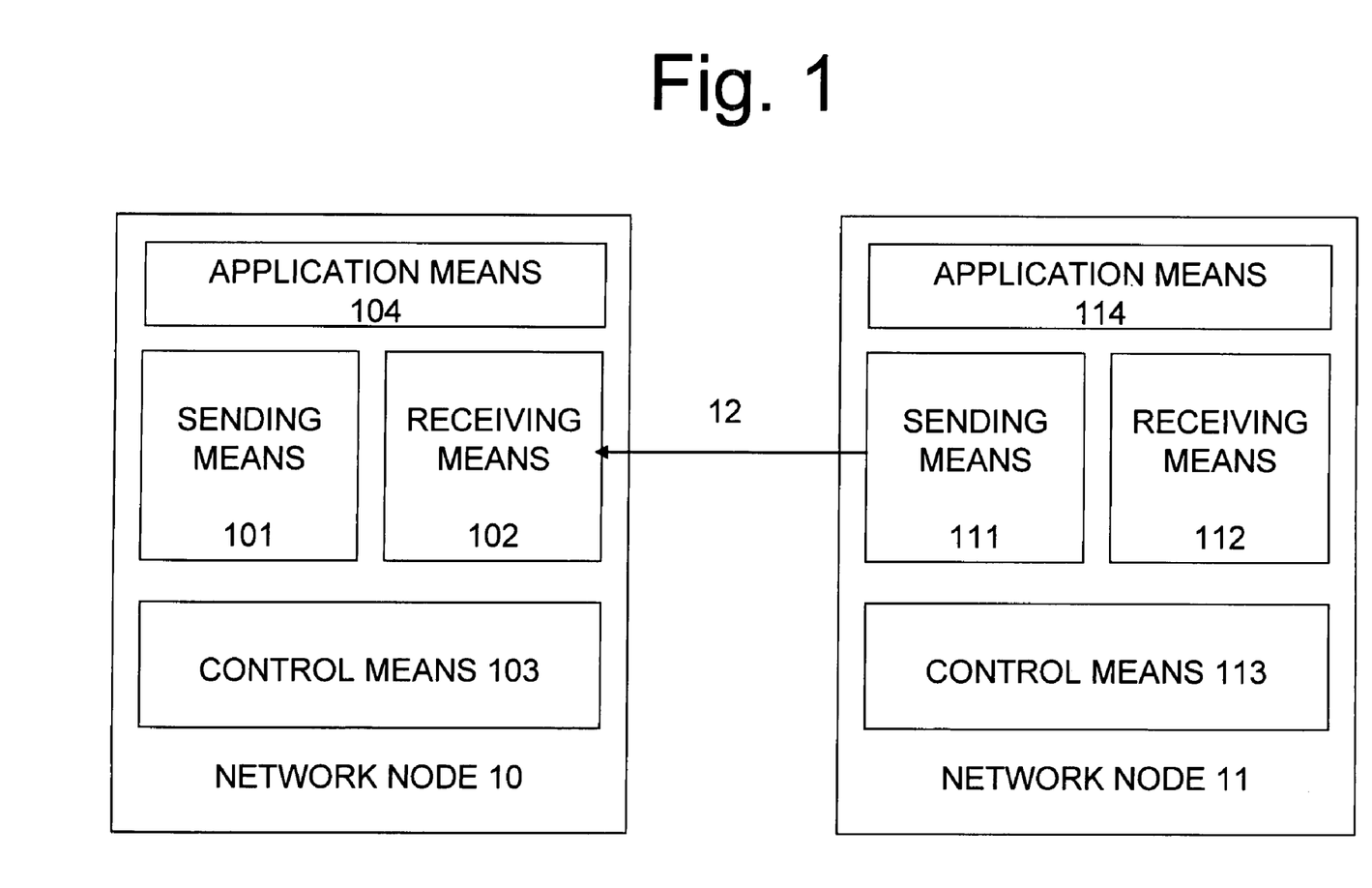
FIG. 1 shows a basic structure of the network nodes according to the invention.

FIG. 1 shows a simple example for a network system comprising network node which is configured for the PoH scheme described above. It is noted that a network system according to the invention may comprise a plurality of such network nodes (i.e., much more than two), but in order to simplify the illustration, only two network nodes are shown. It is noted that FIG. 1 shows only a very basic structure, that is, only those elements are shown which are important for understanding the invention.

In detail, each network node 10 (or 11) comprises a sending means 101 (or 111), a receiving means 102 (or 112) and a control means 103 (or 113). The sending means and the receiving means provide a connection to other network nodes of a group, i.e., are configured to send a message to other network nodes of the group and to receive a message from another network node of the group. The control means performs a function by which a group is formed temporarily with at least one of the plurality of network nodes. For example this is effected such that necessary connection information as to how the other network node(s) can be reached are stored and used by initiating a call or sending a message. The sending means and the receiving means of the network nodes are adapted to provide a direct contact via a radio connection between at least two network nodes of the group. The radio connection is indicated by the arrow 12 between the sending means 111 of the network node 11 and the receiving means 102 of the network node 10. The application means (104 and 114) on the other hand, are in the charge of generating the application request, contents and providing the appropriate User Interface (UI) for the end user and the middleware functions like Service Discovery (SD). There are two occasions where PoH could be used and these are described next:

1) A situation where none of the ad hoc network terminals are connected to a GPRS network. That is, the local ad hoc network is formed and operates independently. In this situation the floor control could be done by 1.1) utilizing Request to Send (RTS) and Clear to Send (CTS) signalling in a link layer protocol. 1.2) Utilising a Trunk Node (i.e., a master node). 2) A situation where at least one ad hoc network terminal is connected to an overlay network such as cellular or Internet. In this situation, a regular PoC server can be used, but new features are required. For example, the PoC server, which could then be a PoH server, would need to support local ad hoc networks by, e.g., managing services, managing floor control using a Trunk Node etc.

In the following, the basic procedure for the multihop Ad Hoc push-to-talk is described by referring to the enclosed drawings. This procedure is, for the user, as simple as the conventional PoC feature. The main principles of the PoH can be summarized as follows:

The Ad Hoc user selects an Ad Hoc PoC group and starts the Ad Hoc service by pushing the PoH bottom (like Push-To-Talk, PTT bottom). This way, she/he requests a PoC connection to the destination node. There are at least two options for establishing the PTT session, which are described in the following:

Option a):

This option is described in the following, wherein the basic procedure is described as the first embodiment of the invention. The first embodiment is related to when the service is provided by a stand-alone Ad Hoc network. A source node starts discovering the destination nodes, that is, those nodes that have registered to the PoH group in the time of group creation. This is done by triggering a pure Ad Hoc multihop routing such as Ad Hoc On-demand Distance Vector (AODV) routing protocol and algorithm or any other proactive, reactive, or hybrid routing protocols as for example specified in MANET, or alike. [Elizabeth M. Royer and Chai-Keong Toh "A Overview of Current Routing Protocols for Ad Hoc Mobile Wireless Networks", IEEE Personal Communication, April 1999, pp. 46-55]. For example, when using AODV, periodic beaconing and sequence numbering procedure of Destination-Sequenced Distance Vector (DSDV) and a similar route discovery procedure as in Dynamic Source Routing (DSR) are used. However, in AODV protocols the packets carry the destination address in order to avoid additional overhead in the network. In addition, instead of carrying the address of every node along the route in the reply message route, replies only carry the destination IP address and the sequence number.

Generally the main task of routing protocols is to find a route to deliver packets from a given source to a given destination. This must be done in an efficient way to minimize the cost of this delivery, but also with a delay as small as possible.

Figure 2:
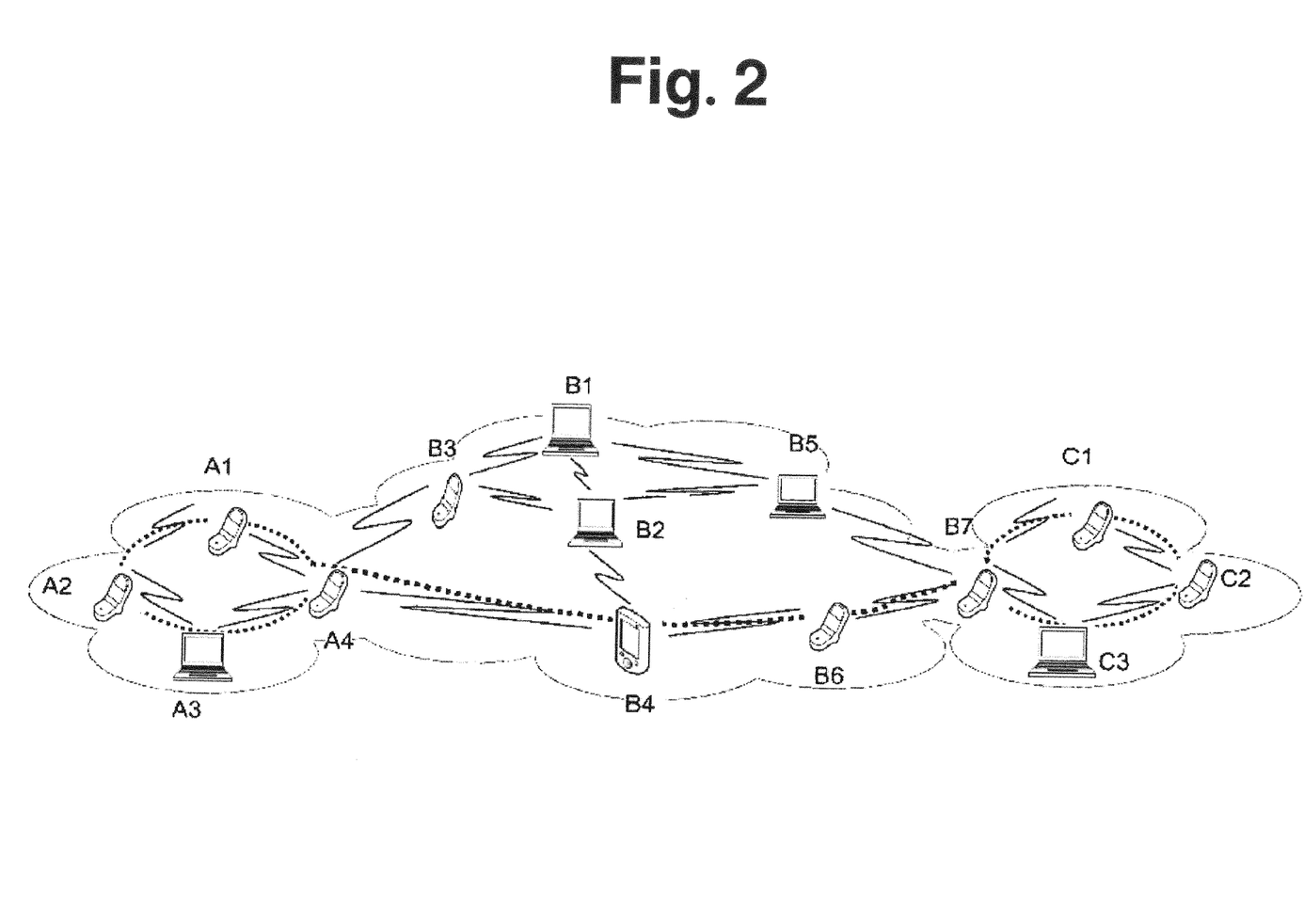
FIG. 2 illustrates a first embodiment of the invention, according to which the a PTT over standalone singlehop or multihop Ad Hoc network is provided.

The first embodiment is illustrated in FIG. 2. Here, three groups of network nodes are shown, wherein the network nodes concerned may be mobile phones, PDAs (Personal Digital Assistant devices), computers having a wireless connection and the like. The first group is formed by the network nodes A1 to A4. The second group is formed by the network nodes B1 to B7 and network node A4 which is also a member of the first group. The third group is formed by the network nodes C1 to C3 and the network node B7 being also a member of the second group. In this configuration, multi-hops are possible. For example, the first group may contact the third group via the second group. That is, a member of the first group (e.g., network node A2) can start a push-to talk call to the third group, which is forwarded to the third group via the network nodes B4 and B6 of the second group. This is the so-called multihop scheme.

In the following it is shortly described how, for example, network node A1 starts to participate to the first group. In detail, the network node A1 is the source node in this example, and it starts to discover the remaining nodes A2 to A4 by referring to the AODV, for example, from which it knows the identity of the other nodes and how he can reach them (i.e., address and the like).

Figure 3:
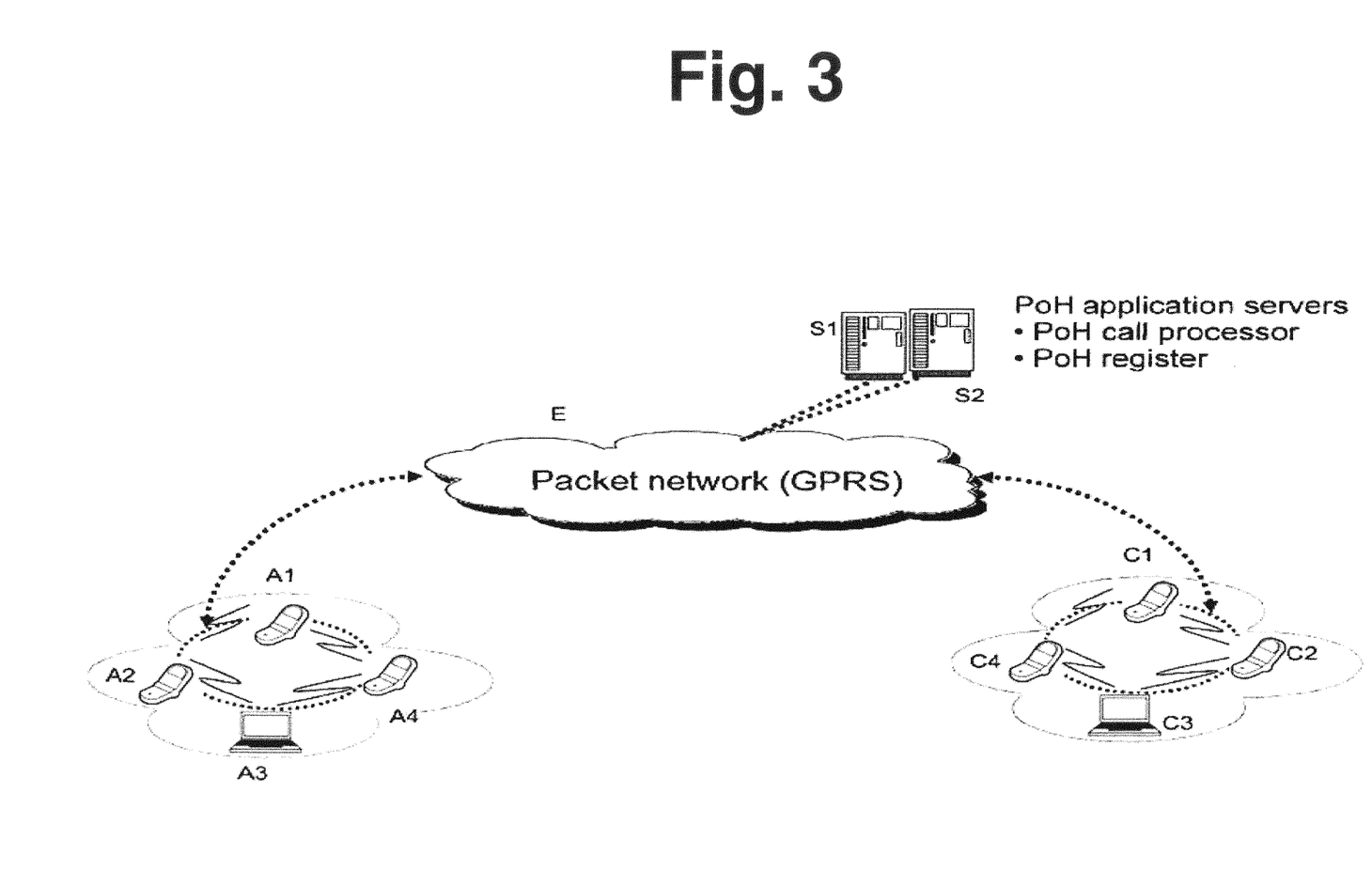
FIG. 3 illustrates a second embodiment of the PTT according to the invention, according to which single hop proximity PTT connections are tied together by using overlay cellular network.

A modification of the first embodiment is described as a second embodiment by referring to FIG. 3. According to the first embodiment, the first and the third network group were connected using the multihop function via the second group. According to the second embodiment, however, the overlay packet network (e.g., GPRS) is used in order to provide a connection between the two groups. It is noted that the two groups are formed as ad hoc network as described above in connection with the first embodiment. Hence, according to the second embodiment single hop proximity PoH connections are tied together by using an overlay cellular network E.

The connection between the two groups via the cellular network, which may be a packet network such as a GPRS network, can be provided such that one network node of the first group (for example, network node A1) provides a connection to the one network node (for example, network node C1) of the third group, so that these two network nodes are used as a kind of "gateway" nodes by the other nodes of the respective group.

In the packet network E, preferably PoH application server(s) S1 and S2 may be provided. These servers may comprise a PoH call processor and a PoH register. The role of the servers is to control the PoH connection in the overlay network. This may include connection setup, maintenance, and release, flood controlling, PoH group formation, charging and billing information generating, security functions, content providing, etc. To accomplish this, the PoH server may use information and resource available in the network elements like Home Location Register (HLR), Authentication Center (AC), Network Management System (NMS), and so forth.

In particular, the PoC Call Processors handle the management, control and user plane functions of the PoC Service. That is, its main functions may include; speech packet handling such as multiplication, filtering, forwarding and floor control (speech item handling), controlling such as logon/logoff to/from PoC service and one-to-one session controlling like group session controlling as well as authentication of users and checking rights.

A PoC register on the other hand may take care of provisioning functions of the Push to Talk Service. It is the central provisioning database of the PoC system. The Push to Talk Core Network is connected to the operator's provisioning system through the Push to Talk Register. The PoC Register provides both an Application Programming Interface (API) to customer's existing provisioning system, as well as a direct browser based user interface.

Figure 4:
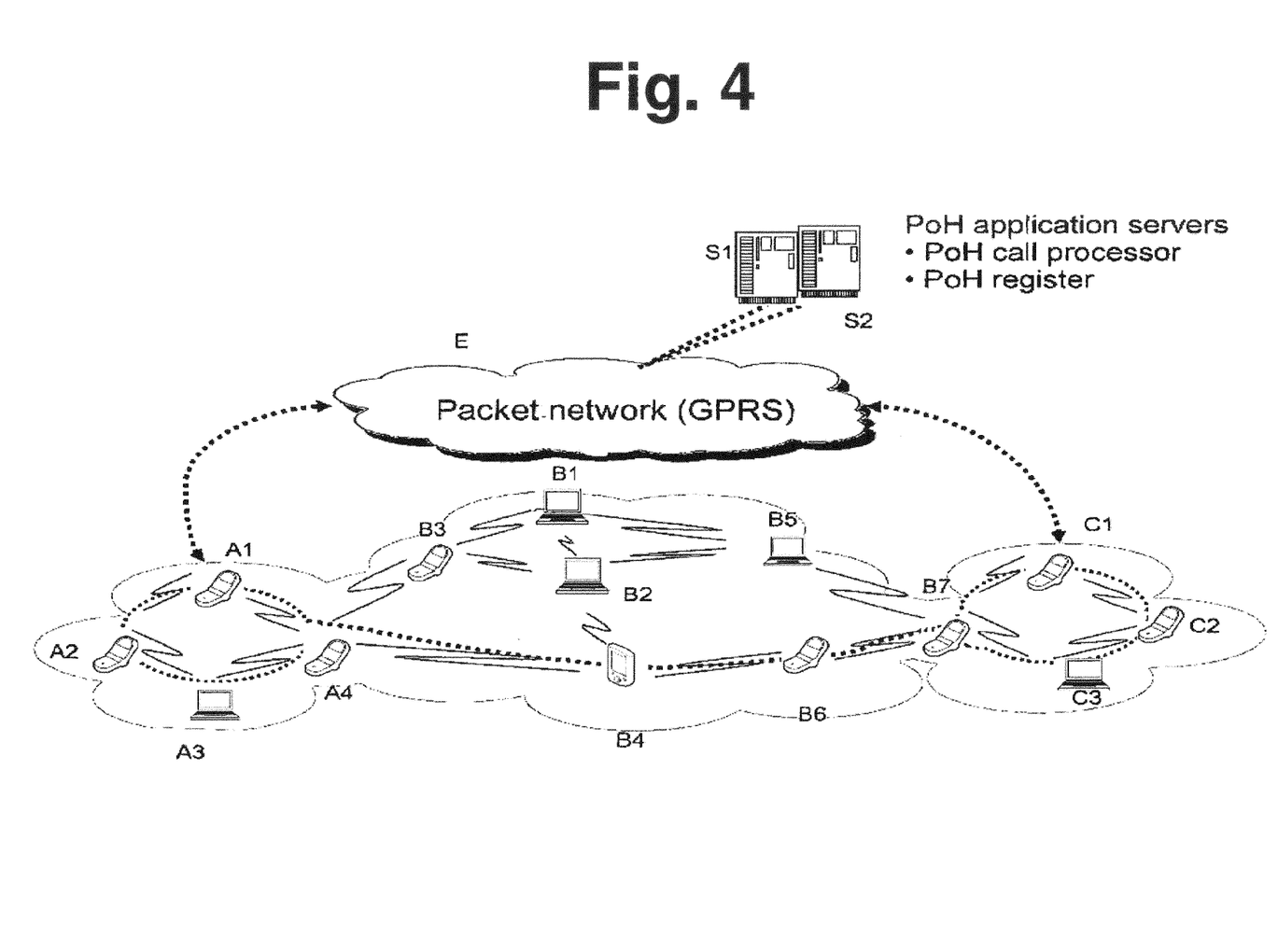
FIG. 4 illustrates a third embodiment of the PTT according to the invention, according to which multihop PTT connections are assisted by the overlay cellular network to share the network load, security services (Subscriber Identity Module, SIM), charging, etc. and assisting the Ad Hoc network in establishing the PTT (routing information, service discovery, etc.).

Another modification is described in the following as a third embodiment and is shown in FIG. 4. Here, in principle the first and the second embodiments are combined. Namely, according to the third embodiment of the invention multihop PoH connections are assisted by the overlay cellular network E (similar as in the second embodiment) to share the network load, security services (Subscriber Identity Module, SIM), charging, etc. and assisting the Ad Hoc network in establishing the PoH (routing information, service discovery, etc.). The actual connection (e.g., sending a voice message from the first group to the second group) can still be made via the second network group, as in the first embodiment, so that the signalling and in particular the user data traffic load in the overlay network is reduced.

As mentioned above, besides the option a) described above by referring to the first to third embodiments, there is at least a further option b) for establishing the PoH session, which is:

Option b):

As an alternative to the option a) described above, the Ad Hoc multihop routing may be executed with the assistance of the overlay network elements/servers or other elements like local servers. This is described in the following as a fourth embodiment and is described by referring FIGS. 4 to 6.

Figure 5:
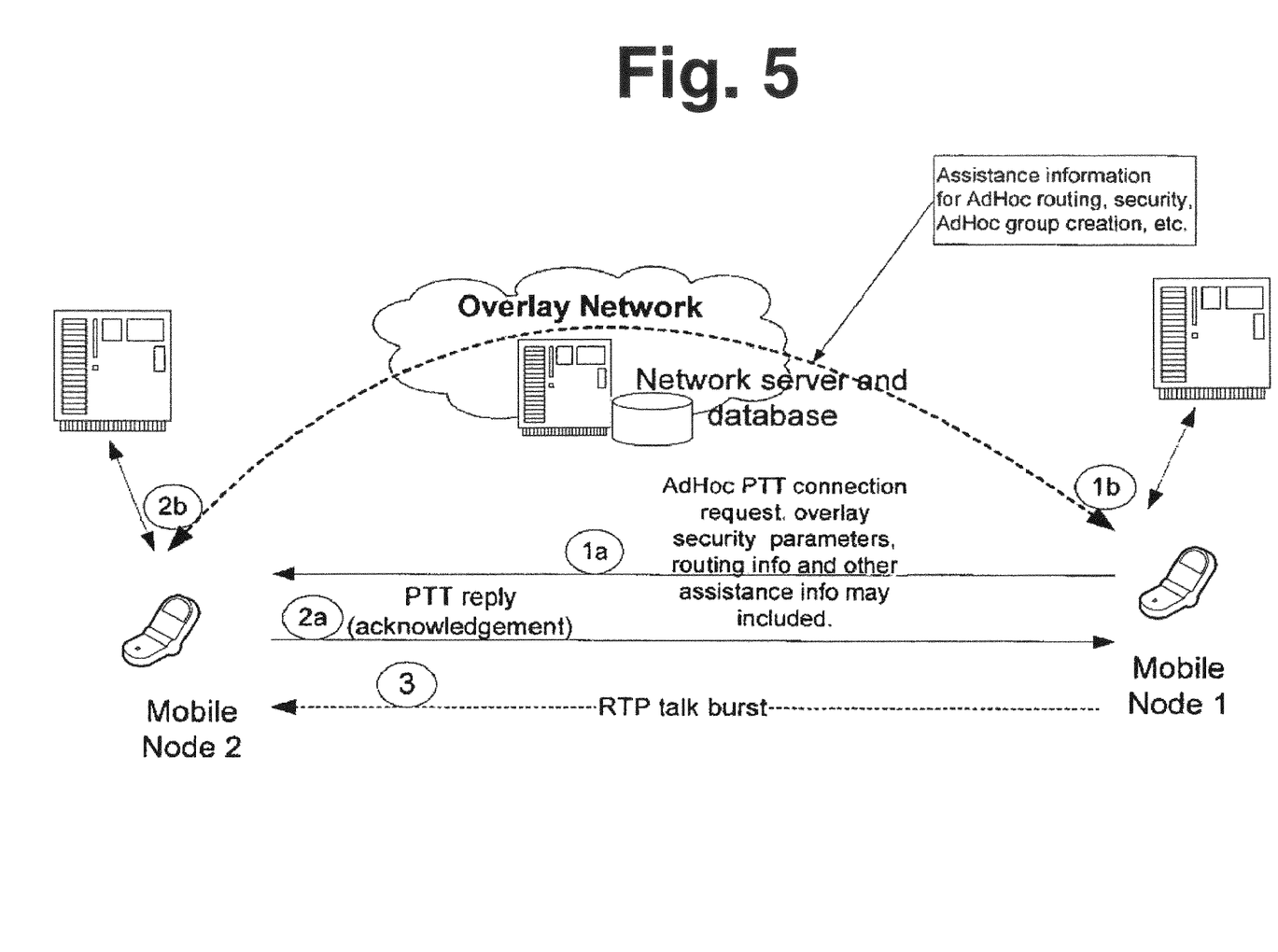
FIG. 5 illustrates signalling connection setup, direct AdHoc and via a cellular network according to a fourth embodiment of the invention.

In detail, FIG. 5 illustrates the signalling connection setup for a direct Ad hoc network connection via cellular network.

A server may also act as a serving Base Station (BS) or overlay network server(s) to which the Ad Hoc node has been registered or is under its control. As illustrated, this server may provide assistance information for AdHoc Routing, security, AdHoc group creation etc. This server may be a dedicated PoH server, or may be integrated in a server of the overlay network. The server may comprise a storage means such as a database in which the necessary information are stored.

Thus, in the illustrated example, the mobile node (e.g. Node 1 in FIG. 5) requests a session establishment from the overlay network like cellular to reach the destination node (Node 2 in FIG. 5).

This is illustrated in FIG. 5 by messages 1a and 1b. In message 1a, the mobile node 1 issues an AdHoc PTT connection request. This can be performed directly (similar to the first embodiment), but according to the present embodiment, the server mentioned above assists the mobile node 1 in finding the destination node. In particular, the server provides the assistance information for the AdHoc routing, i.e., in particular the information that helps the mobile node 2 to be reached. This is provided from the server in the overlay network by message 1b.

That is, it is assumed that the network server or base station has the information of nodes' mobility while there are in the coverage area of the network. This assistance routing information is used by Node 1 to reach the destination Node 2 within a shorter delay and by consuming less resource (processing, energy, etc.) to execute the multihop routing and in general to reach the destination. Upon Node 1 has received the assistance information from the overlay network, it starts reaching the destination node (message 1a). If the destination node is in proximity e.g. within a single hop far away from the source node the process would remain quite simple. If the destination is a multihop far away from the source a multihop Ad Hoc routing should be triggered (similar to that shown in FIG. 1).

Upon the reception of a reply message 2a from the Node 2 in response to the message 1a, the AdHoc PTT connection is setup and the PTT service can be used, including speech, data, multimedia, etc. The rest of operation would be similar to a conventional PTT service; the caller pushes the bottom and speaks. When the message is completed she/he release the bottom and the bursty message (message 3 in FIG. 5) is sent to the terminated node 2. Therefore, having extracted the routes (or part of the routes) to the destination nodes, the IP connection is formed and the half-duplex bursty traffic is sent from the source to the destination nodes.

In addition to the wireless routing protocols mentioned above, the main protocols involved in the connection setup are session handling in the IP layer e.g. as part of SIP protocols. However, modifications in the messages and possibly new messages due to the multihop Ad Hoc operation may be needed as is for the wireless routing protocols while PTT request or assistance data could be encoded in the routing messages. The modifications are for specifying that for example the connection request is a type of PoH connection. Therefore, the information parameters of call control protocols (SIP or Connection Management in IP and cellular, respectively) should include the PoH related information elements.

As is for conventional PoC, if the streaming class can be supported by the Ad Hoc network, then an interactive traffic class context (e.g. for Packet Data Protocol, PDP) should be used for Session Initiation Protocol (SIP) and Hypertext Transfer Protocol (HTTP) signalling; and a streaming traffic class PDP context should be used for the RTP/RTCP packets. If streaming QoS (Quality of Service) is not available, then either two interactive PDP contexts, or a single PDP context (for PoC signalling and RTP media) may be used.

Figure 6:
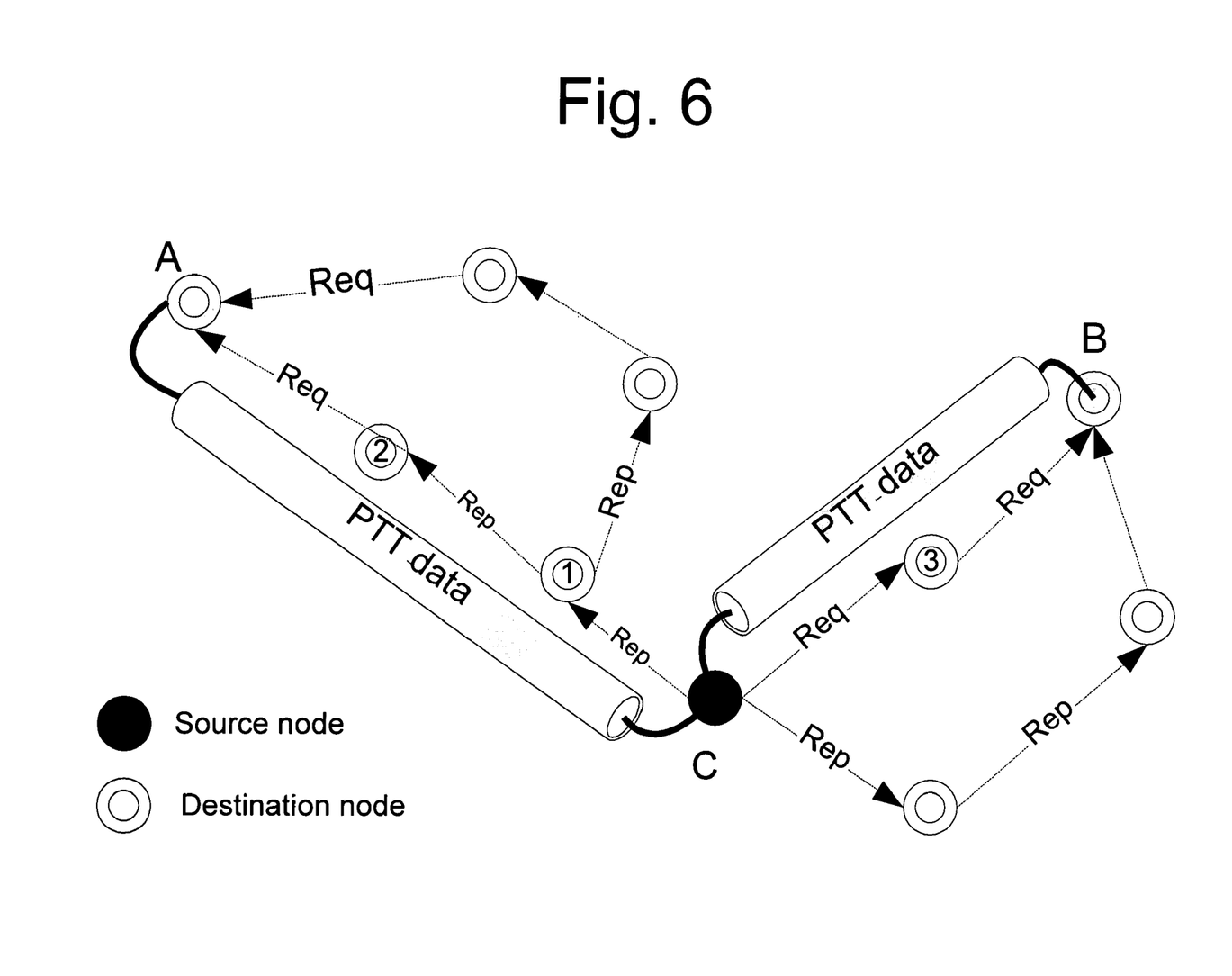
FIG. 6 illustrates PoC AdHoc multicasting according to the fourth embodiment of the invention.

As the PTT data is basically bursty (i.e., is transmitted in bursts), it can be transferred by utilizing multicasting (transmission to many users), groupcasting (transmission to a selected group of users), or unicasting (transmission to one user). This way the PoH data is multicasted over the multihop or singlehop radio link and forwarded to the destination node. This is illustrated in FIG. 6. In this figure, it is assumed that source node C is going to contact destination nodes A and B. First, it sends a request message by using multicasting, groupcasting, or unicasting to page the destination nodes for the PTT service. As mentioned earlier, this request can be carried independently or as part of protocol parameters embedded in the control message packets. For instance, if the underlying protocols for physical and link layers are based on Wireless LAN (802.11b), the control messages, including request messages (indicated by req in FIG. 6) and reply messages (indicated by rep in FIG. 6) for PTT service could be included or otherwise tied to the Request-to-Send (RTS) and Clear to Send (CTS) messages. These messages can then be flooded within the neighboring nodes, as indicated in FIG. 6 by the arrows from the source node C to the other nodes. If the target is a specific node, groups, or subgroups, the group ID or the node IP addresses are used to reach the destination nodes.

As shown in FIG. 6, the best path is selected via which the PTT data is transferred. That is, in the example of FIG. 6, the PTT data from the source node C to the destination node A is transferred via intermediate nodes 1 and 2, whereas the PTT data from the source node C is sent to the destination node B via the intermediate node 3. The determination which is the best path can be performed by the source node C and/or the corresponding destination node A or B, for example.

In the following, the role of a gateway (master node, cluster head) is described in detail.

In case Mobile 1 in FIG. 5 does not have support of overlay network, it is also possible that Mobile 1 uses Mobile 2 as a gateway towards the overlay network (cellular, Internet, etc.). When so, Mobile 2 can use the overlay network for security issues like authorizing Mobile 1, extending the range of PTT service to the wide area network; connect Mobile 1 to the PTT service for a long distance PTT session over the background network. In fact, Mobile 1 chooses Mobile 2 as the head of or master Ad Hoc cluster. If there are more than one mobile like Mobile 1 connecting to the Mobile 2, the cluster head or master that is also a gateway can play a role of PTT server so that it coordinate the PTT within a group of Ad Hoc nodes and on the other hand it connects its subgroups PTT to the other subgroups either within the local Ad Hoc area or over the background network. Within the cluster, the master node may also schedule the time and arrangement of the PTT connections or floods.

For example, when a subnode wants to initiate PTT service with another node that is a member of the same cluster it requests the PTT from the master node who transfers the request to the other nodes, conveys also the reply message and coordinates the time PTT user used for PTT service (bottom push time).

Figure 7:
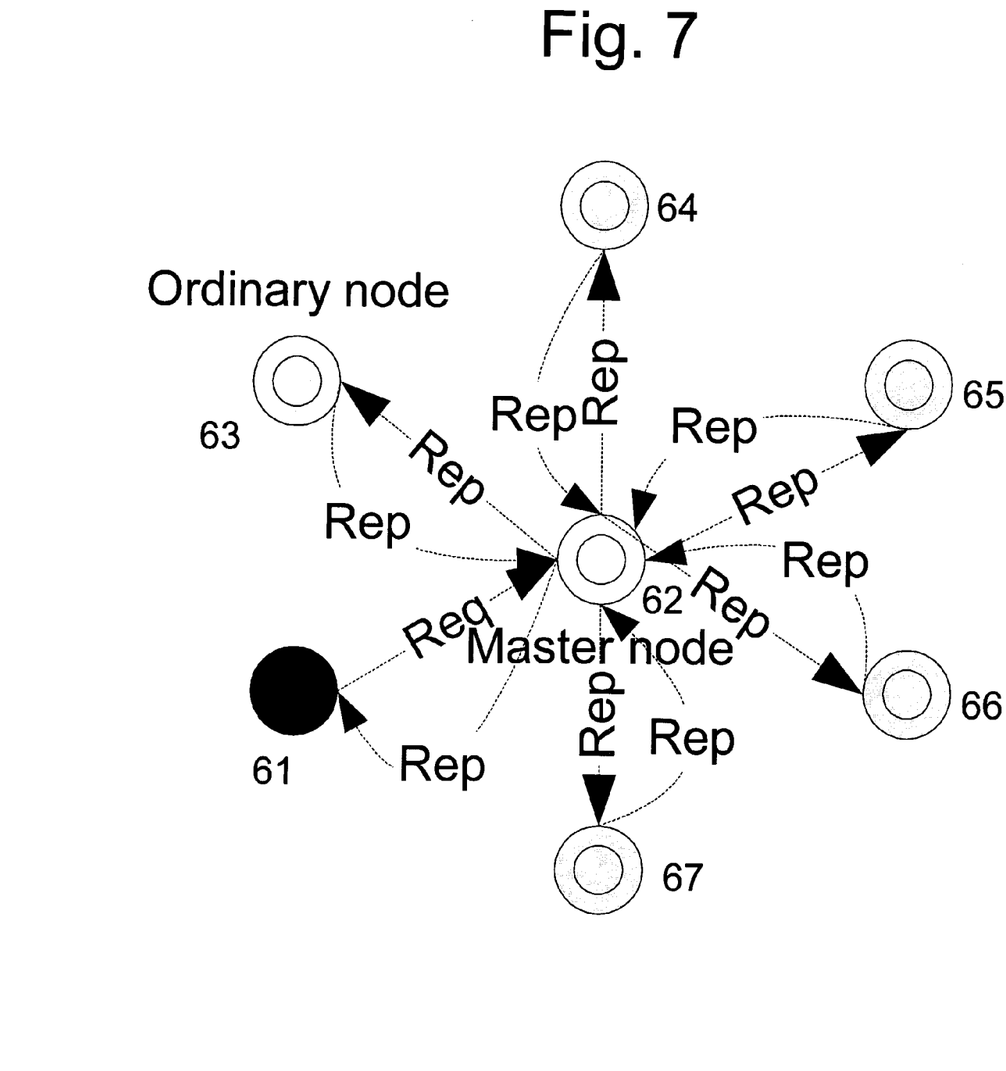
FIG. 7 illustrates the role of a gateway node in PTT connection establishment and handling according to the fourth embodiment of the invention.

FIG. 7 illustrates a situation where a source node 61 is going to establish a PTT session with all the other nodes 62 to 67 within the cluster/group. It sends a request message to the master node 62. The master node 62 polls other ordinary nodes 63 to 67 for the requested PTT and finally it replies to the source node. The source node starts PTT service with those nodes that have accepted the request upon it receives the acknowledgement.

The master node may become a PTT server in this situation. When so, the basic functionality of the gateway node (master) includes management and control of user and control plane functions of the PoH Service within the cluster and possibly in interaction with the network server. The functionality may include:

Speech packet handling: multiplication, filtering, forwarding and floor control (speech item handling)

Controlling: logon/logoff to/from PoC service; one-to-one session controlling; group session controlling Authorization: authentication of users and checking rights, key sharing, boot.

The gateway node may also provide both an Application Programming Interface (API) shared browser based user interface, storage capacity, charging, info sharing, etc.

When PoH is tied to the overlay network and by the help of e.g. gateway or master node it should be possible to swap the individual PTT connections from the Ad Hoc to the cellular network and vice versa during the time of the service. This can be achieved e.g. by using an indicating procedure that informs the nodes involved in the PTT service to swap the network connections. For example, mobile nodes involved in the cellular PoC are indicated to turn on their short-range radios to try to reach each other by triggering their short-range radios and wireless routing in used. To do this, it is enough to trigger the route discovery by a single node involved in the PoC connection when it is provided for the IP address or ID of the destination nodes to be reached.

It is noted that in the example of FIGS. 2 and 3 (second and third embodiment), the network nodes A1 and C1 could play the roles of such a gateway or master node, for example.

In the following, the security aspect in the PoH is described.

Namely, with the same approach and procedure Node 1 (shown in FIG. 5) can initiate a connection setup towards the overlay network (like GSM, WCDMA, etc.) and request a security session establishment and reuse the extracted security parameters to ensure a trustable connection over multihop Ad Hoc to the destination node. This can be done in the combination of the signalling messages 1a and 1b in FIG. 5. In this respect, Node 1 requests an ordinary connection establishment (GSM, WCDMA, etc.) to the Node 2 which is also within the coverage of the overlay network. Once, the traditional security session (e.g. for ordinary GSM of WCDMA call establishment) has been executed and the security parameters has been exchanged (authorization, security key exchange, etc.), Node 1 initiates an Ad Hoc connection via the Ad Hoc network and by possibly encoding the output parameters of the interaction with the overlay network. If Node 2 accepts the request and offered parameters it replies to Node 1 for the connection (2a in FIG. 4). That is, with the help of the overlay network, a secure connection can be established.

Next, the problem of a possible route fault is discussed.

That is, in case there is no stable route to some destination nodes at the time of routing (e.g., the radio connection such as Bluetooth or the like does not work properly), the integrated PTT (i.e., a combination of multihop PoH and using of the overlay network, similar as shown in FIG. 4) could be used, providing the service by using the network resource. In the integrated PTT, some nodes are reached via the Ad Hoc network while the others are reached over cellular network. This way, the challenge of connectivity in Ad Hoc network is alleviated with the help of overlay cellular network. In addition, the integrated PTT can be used when balancing the load between the cellular and Ad Hoc networks or sharing the security, charging, and control and data services of the overlay network.

In the following, some examples for PoH groups are listed:

Provisioned Group

A provisioned group is a talk group that has been pre-configured to the system by the operator, including individual operators, ISPs, local users or another authorized management user. A closed user group and user rights to services define the group members. Provisioned groups can be identified by for example using URLs (Uniform Resource Locator), Ad Hoc network ID, IP address, etc. An operator or ISP can also be an individual such as a user of an Ad Hoc node. When so, a group of Ad Hoc nodes (user) agreed in advance to form a PTT group for different service like voice, messaging (text, image, etc.), video streaming, etc. On the other hand, one or several users of the group may have agreement with a legacy operator in having network-based PTT service. These master users can become a gateway between the local PoH and operator PoC.

Ad Hoc Group

In the ad hoc group feature, the end users themselves can create the groups. Thus, a user does not have to have access to a pre-configured group in order to have group communication within the PTT service. From the network perspective, group definitions are temporary. However, a group may be stored in terminals for further use. Ad hoc groups may also be identified by URLs (Uniform Resource Locator), Ad Hoc network ID, IP address, etc. The Ad Hoc group formation may be initiated based on the results of services discovery, as well. That is, the source node initiates the SD for searching a desired service. Once there are some nodes who can provide the requested services, or are interested in involving in the requested PTT service then the Ad Hoc group is formed, accordingly.

Ad Hoc Pro Group

In the ad hoc pro group, the end users themselves can create groups to which access is limited to predefined users. This feature is primarily intended for business users utilizing the closed user group feature. Ad hoc pro group combines security of pre-configured groups and flexibility of ad hoc groups. Ad hoc pro group is a temporary talk group, which the users can establish by their own based on a provisioned group. Nobody outside the provisioned group can join it. Ad hoc pro groups could also be identified by URLs (Uniform Resource Locator), Ad Hoc network ID, IP address, etc.

The PoC service could support closed user groups for companies and other mutually affiliated users. For group communications, closed user groups means that nobody outside i.e. the company can join the group session of that company. Additionally it is possible to give the right to join group sessions for certain other users—outside the company, if needed. When possible, the local PTT service is conveyed over Ad Hoc network. That is, a group of colleagues in one premises can have a PTT service with another group of colleagues in another premises of the same company via the overlay network. Though, each group can locally have the same service over direct radio link over proximity or Ad Hoc network.

Text Chat within a Talk Group

Text chat between the members of a talk group session provides an additional means of communication to the push to talk group service. Because of the real-time nature of the text chat service, a store-and-forward feature is not provided for the text chat. Text chat is possible concurrently in multiple talk groups. Text chat may be used together with voice communication to send e.g. names in order to avoid misspelling.

Image Chat within a Group

Image chat between the members of a talk group session provides an additional means of communication to the push to talk group service. Because of the real-time nature of the image chat service, a store-and-forward feature is not provided for the image chat. Image chat is possible concurrently in multiple groups. Image chat may be used together with voice communication to send e.g. images in order to create an interactive discussion. In some other case, this could be a basis for wireless gaming.

Proximity Group

The proximity group can be formed based on the neighborhood in terms of radio being within the coverage of short-range radios like Bluetooth, Ultra Wideband (UVB), WLAN, etc. For example, one can predefine a group to whom the PTT service is indicated whenever they are within the range of their mobiles' short-range radios. This types of group formation would be useful when a number of end users want to play a wireless game by using their mobile devices and wireless communication.

In order to include the invention into existing network systems, this can be easily affected. Namely, only minor changes to the software features of network elements, mainly to the PoC servers are needed, assuming that the basic PoC and short-range technologies in the mobile handset will widely be available in the close future. Initially, it is likely that the basic function of the PTT will be materialized by utilizing single hop Ad Hoc networking such as Bluetooth Personal Area Network (PAN) and WLAN. The next step will be to extend the functionality to cover the multihop Ad Hoc networks.

The proposed method improves earlier solutions by bringing the Ad Hoc networking capability to the basic PoC service. The key advantages of the proposed method are as follows:

- It broadens the capability of cellular PoC and generates proximity and Ad Hoc data to/from the overlay network.
- It can built on top of the existing service platform.
- It has a clear demand aligned with the soon available cellular PoC.
- It is suitable for Ad Hoc networking characteristics, as Ad Hoc networks are more prone to the interference and bandwidth constraints. PoH saves the radio resources because of its bursty and half-duplex communication.

The invention is not limited to the embodiments described above, which are only illustrative. That is, the invention is only defined by the claims.

Moreover, several modifications of the embodiments are possible. In particular, the embodiments can be arbitrarily combined.

For example, the PoH server described in connection with the third embodiment and illustrated in FIG. 4, which serves to assist in establishing a connection between the two ad hoc groups, can play the role of the server shown in FIG. 5, i.e., to assist, for example, the network nodes in the individual groups to create the group or establish a connection within the group.

Moreover, as already indicated above with respect to text chat, the messages transmitted via the push-to talk service are not limited to voice messages. These voice messages are only an example for information transmitted between the network nodes. That is, also other kind of messages such as text messages, multmedia messages (image, video clips, music, etc.) and the like can be transmitted via the push-to talk service according to the invention.

Furthermore, according to the embodiments described above, a half-duplex radio connection is used for providing a direct contact between the network node. However, the invention is not limited to a half-duplex radio connection, but any kind of radio connection can be applied.

The invention claimed is:

1. A network system comprising a plurality of network nodes, wherein:
   a first plurality of network nodes comprises means for temporarily forming a first group with the first plurality of network nodes in communication with each other using sending means for sending information to the first group and receiving means for receiving information from the first group; and
   a second plurality of network nodes comprises means for temporarily forming a second group with the second plurality of network nodes in communication with each other using sending means for sending information to the second group and receiving means for receiving information from the second group;
   wherein a first network node is included in the first plurality of network nodes and the second plurality of network nodes and configured to provide communication between the first group and the second group;
   wherein the sending means and the receiving means are configured to provide a direct contact via a radio connection between at least two network nodes of the first group and the second group.

2. The network system according to claim 1, wherein the radio connection is a half-duplex radio connection.

3. The network system according to claim 1, wherein the sending means is configured to forward information received by the receiving means from the first group to the second group.

4. The network system according to claim 3, wherein at least one of the first plurality of network nodes comprises means for selecting a path between a source node and a destination node.

5. The network system according to claim 1, wherein the radio connection is realized using at least one of a Wireless Local Area Network (WLAN) standard, a Bluetooth standard, and an Ultra Wide Band (UWB) technology.

6. The network system according to claim 1, wherein:
   a third plurality of network nodes forming a third group; and
   wherein a network node of the third plurality of network nodes is included in the second plurality of network nodes and the third plurality of network nodes and is configured to provide communication between the second group and the third group, and the second group is configured to forward information sent between the first and third groups.

7. The network system according to claim 1, wherein a connection between the two groups is provided via a mobile communication network.

8. The network system according to claim 7, wherein the mobile communication network comprises means for assisting in establishing the connection between the two groups.

9. The network system according to claim 7, wherein in each of the two groups one network node is connected to the mobile communication network and is configured to act as a gateway node for other network nodes of a corresponding group.

10. The network system according to claim 7, wherein the mobile communication network comprises a packet network.

11. The network system according to claim 1, further comprising a network control node comprising means for assisting the first plurality of network nodes in establishing the first group.

12. The network system according to claim 8, wherein the means for assisting comprises means for providing routing information, security information and group creation information.

13. The network system according to claim 1, wherein the group is identified by one of a Uniform Resource Locator (URL), a group identifier, and an Internet Protocol address.

14. The network system according to claim 1, wherein the first group is an ad hoc network group, and the radio connection provides a push-to talk service.

15. The network system according to claim 1, wherein the information comprises one of voice, text message, and images.

16. A method for controlling network system comprising:
    temporarily forming a first group including a first plurality of network nodes,
    temporarily forming a second group including a second plurality of network nodes,
    sending and receiving information between the first group and the second group, wherein a first network node included in the first plurality of network nodes and the second plurality of network nodes sends and receives the information between the first group and the second group;
    wherein the information is sent and received using a direct contact via a radio connection between at least two network nodes of the first group and the second group.

17. The method according to claim 16, wherein sending and receiving further comprises providing the direct contact via a half-duplex radio connection.

18. The method according to claim 16, further comprising: selecting a path between source node and a destination node.

19. The method according to claim 16, wherein the radio connection is realized using at least one of a Wireless Local Area Network (WLAN) standard, a Bluetooth standard and an Ultra Wide Band (UWB) technology.

20. The method according to claim 16 further comprising:
    temporarily forming a third group including a third plurality of network nodes,
    wherein a network node of the third plurality of network nodes is included in the second plurality of network nodes and the third plurality of network nodes and is configured to provide communication between the second group and the third group, and the second group is configured to forward information sent between the first and third groups of network nodes.

21. The method according to claim 16, wherein the connection between the two groups is provided via a mobile communication network.

22. The method according to claim 21, further comprising: assisting in establishing the connection between the two groups by a network control node of the mobile communication network.

23. The method according to claim 21, wherein in each of the two groups one network node is connected to the mobile communication network and acts as a gateway node for other network nodes of a corresponding group.

24. The method according to claim 22, wherein the mobile communication network is a packet network.

25. The method according to claim 16, further comprising: assisting the first plurality of network nodes in establishing the first group by a network control node.

26. The method according to claim 22, further comprising providing routing information, security information and group creation information by the network control node.

27. The method according to claim 16, wherein the group is identified by one of a Uniform Resource Locator (URL), a group identifier, and an Internet Protocol address.

28. The method according to claim 16, wherein temporarily forming the group further comprises temporarily forming an ad hoc network group including the first plurality of network nodes, wherein the radio connection provides a push-to-talk service.

29. The method according to claim 16, wherein the information comprises one of voice, text message and images.

30. A network control node, comprising:
 means for establishing a connection between two groups of network nodes, wherein
 each group of network nodes is formed temporarily and comprises at least two network nodes,
 a connection between the network control node and at least one network node is established via a mobile communication network, and
 the connection within each group is provided as a direct contact via a radio connection between at least two network nodes of the group, wherein the radio connection is a half-duplex radio connection.

31. The network control node according to claim 30, wherein the establishing means comprises means for providing routing information, security information and group creation information.

32. The network control node according to claim 30, wherein the mobile communication network comprises a packet network.

33. A network control node, comprising:
 means for establishing a connection between two groups of network nodes, wherein
 each group of network nodes is formed temporarily and comprises at least two network nodes,
 a connection between the network control node and at least one network node is established via a mobile communication network, and
 the connection within each group is provided as a direct contact via a radio connection between at least two network nodes of the group, wherein the group is identified by a Uniform Resource Locator (URL).

34. The network control node according to claim 33, wherein the establishing means comprises means for providing routing information, security information, and group creation information.

35. The network control node according to claim 33, wherein the mobile communication network comprises a packet network.

36. A network control node, comprising:
 means for establishing a connection between two groups of network nodes, wherein
 each group of network nodes is formed temporarily and comprises at least two network nodes,
 a connection between the network control node and at least one network node is established via mobile communication network, and
 the connection within each group is provided as a direct contact via a radio connection between at least two network nodes of the group, wherein the group is an ad hoc network group, and the connection provides a push-to-talk service.

* * * * *